(12) United States Patent
Yan et al.

(10) Patent No.: US 6,975,454 B1
(45) Date of Patent: Dec. 13, 2005

(54) VARIABLE POLARIZATION-DEPENDENT-LOSS SOURCE

(75) Inventors: Lianshan Yan, Los Angeles, CA (US); X. Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 215 days.

(21) Appl. No.: 10/209,824

(22) Filed: Jul. 31, 2002

Related U.S. Application Data

(60) Provisional application No. 60/309,227, filed on Jul. 31, 2001.

(51) Int. Cl.[7] ............................................. G02B 27/28
(52) U.S. Cl. ...................... 359/484; 359/900
(58) Field of Search ................... 359/484, 900

(56) References Cited

U.S. PATENT DOCUMENTS

| | | | | |
|---|---|---|---|---|
| 4,478,494 A | * | 10/1984 | Soref | 359/320 |
| 4,917,452 A | * | 4/1990 | Liebowitz | 349/197 |
| 5,111,321 A | * | 5/1992 | Patel | 349/198 |
| 5,740,288 A | * | 4/1998 | Pan | 385/11 |
| 5,771,120 A | * | 6/1998 | Bergmann | 359/484 |
| 5,963,291 A | * | 10/1999 | Wu et al. | 349/196 |
| 6,075,647 A | * | 6/2000 | Braun et al. | 359/578 |
| 6,081,367 A | * | 6/2000 | Yokoyama et al. | 359/337.2 |
| 6,275,312 B1 | * | 8/2001 | Derks et al. | 398/9 |
| 6,370,285 B1 | * | 4/2002 | Naganuma | 385/11 |
| 6,370,286 B1 | * | 4/2002 | Krol et al. | 385/11 |
| 6,493,473 B1 | * | 12/2002 | Wooten | 385/11 |
| 6,735,016 B1 | * | 5/2004 | Mao et al. | 359/484 |

FOREIGN PATENT DOCUMENTS

| | | | |
|---|---|---|---|
| JP | 61-102622 A | * | 5/1986 |
| JP | 05-323243 A | * | 12/1993 |

* cited by examiner

*Primary Examiner*—John Juba, Jr.
(74) *Attorney, Agent, or Firm*—Fish & Richardson P.C.

(57) ABSTRACT

An optical device including a beam splitter, polarization controller, and beam combiner is described. In some embodiments, the beam splitter and beam combiner are provided in a single element. An incoming light beam is split into two beams with different polarization components. The polarization of one or both of the beams is rotated using one or two polarization controllers such as fiber squeezers. The beams are then combined, so that a portion of each of the beams is provided to an output. The polarization dependent loss of the device can then be controlled by controlling the polarization rotation. In some embodiments, the rotation is dynamically controlled.

39 Claims, 3 Drawing Sheets

VARIABLE POLARIZATION-DEPENDENT-LOSS SOURCE

REFERENCE TO PREVIOUS APPLICATION

This application claims the benefit of provisional application Ser. No. 60/309,227, filed on Jul. 31, 2001, which is hereby incorporated by reference in its entirety.

TECHNICAL FIELD

This invention relates to optical systems, and more particularly to polarization dependent loss in optical systems.

BACKGROUND

During the past few years, the transmission capacity of fiber optic networks has increased tremendously. As with much of technology, however, more is better, and the limitations of today's technology are impeding the ability of fiber optic networks to fulfill bandwidth demands.

Polarization dependent loss (PDL) is one of the limiting factors in high-capacity wavelength-division-multiplexing (WDM) systems. Many optical network components and erbium-doped fiber amplifiers (EDFA) have non-negligible PDL.

PDL leads to a number of problems in optical networks, such as fluctuation in the optical power and signal to noise ratio (SNR) and enhanced degradation of systems due to the interaction with polarization-mode dispersion (PMD).

Current efforts to control or compensate for PDL are based on the principal that the incidence angle of a crystal or glass is polarization-dependent. Therefore, by tuning the input angle or the position of the crystal or glass, the induced PDL value changes. Here, the induced PDL value is the difference between the maximum and minimum insertion loss for all possible input states of polarization (SOPs). However, such efforts are unable to provide limited variation in the PDL of a system.

Therefore, it is desirable to provide a variable PDL device that may be used to control and/or compensate for PDL in an optical system.

SUMMARY

According to an embodiment of the invention, a variable PDL device includes a beam splitter, a first polarization controller, and a beam combiner, where the beam splitter splits incoming light into a first beam with a first polarization state and a second beam with a second polarization state. The input beam has an input intensity, while the component of the input beam with the first polarization state has a first input intensity and the component of the input beam with the second polarization state has a second input intensity.

After the input beam is split, the first beam has its polarization rotated by a first polarization controller, which may be a fiber squeezer or other controller such as a Faraday rotator, liquid crystal, rotatable waveplate, a combination of a variable retardation plate (made of electro-optic or electro-ceramic material, for example) and a quarter wave plate, or other controller. In some embodiments, a redirection element such as a prism is used to redirect the first beam to the polarization controller after the beams are split.

The first and second beams are combined in a beam combiner. In some embodiments, a second redirection element such as a prism is used to redirect the first beam from the polarization controller to the beam combiner. A portion of the beams is transmitted out of the device on an output port. The portion of the output beam that has the first polarization state has a first output intensity, while the portion of the output beam that has the second polarization state has a second output intensity. The output beam has an output intensity.

The device may include an input port, by which the input beam is provided to the device. The polarization of the second beam may be rotated by a second polarization controller, which may also be a fiber squeezer or other controller such as a Faraday rotator.

The polarization controller may be variable. For example, it may be a fiber squeezer whose rotation angle is varied by changing the voltage on a piezoelectric mechanism. It may be a Faraday rotator whose rotation angle is varied by changing the current through an electromagnet.

The ratio of the first output intensity to the output intensity may be different than the ratio of the first input intensity to the input intensity. The ratio of the second output intensity to the output intensity may be different than the ratio of the second input intensity to the input intensity.

In some embodiments, a beam splitter/combiner may be used rather than a separate beam splitter and beam combiner. A first mirror may be used to reflect the first beam back through a first polarization controller to a redirection element and then to the beam splitter/combiner. A second mirror may be used to reflect the second beam back through a second polarization controller and then to the beam splitter/combiner. The mirrors may be simple reflective mirrors, 90 degree Faraday rotator mirrors, or other mirrors.

A method for controlling polarization dependent loss may include splitting an input beam into a first beam and a second beam, rotating the polarization of the first beam and the second beam, and directing a portion of the first beam and a portion of the second beam to an output port.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
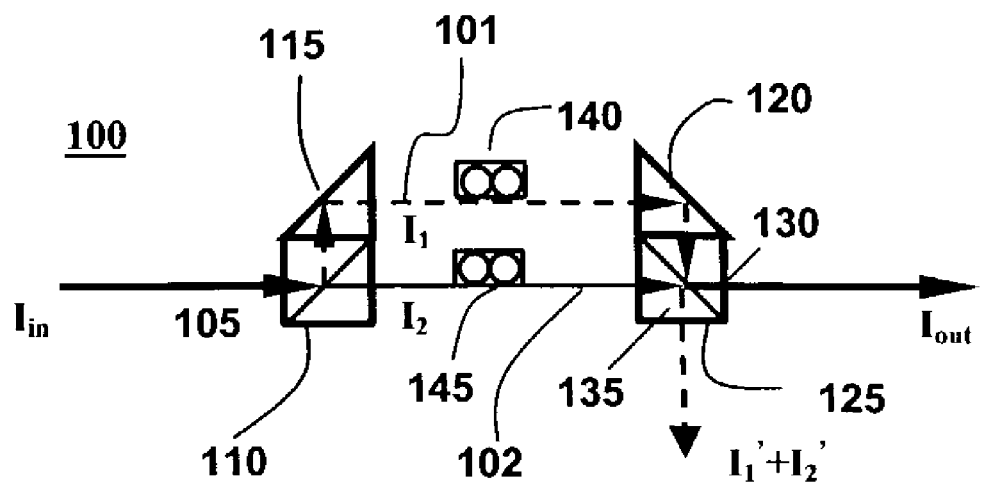
FIG. 1(a) is a side view of a variable PDL device, according to an embodiment of the invention.

According to an embodiment of the invention, a variable PDL device 100 is shown in FIG. 1(a). Light of intensity $I_{in}$, and an initial SOP is input to variable PDL device 100 through port 105. The input beam generally has a component with a first polarization and a first intensity $I_1$(input) and a component with a second polarization and a second intensity $I_2$(input) (although for a polarized beam, the input beam may have only one component). The fraction of the intensity of the input light that is in the first polarization state is then $I_1(input)/I_{in}$, while the fraction of the intensity of the input light that is in the second polarization state is $I_2(input)/I_{in}$.

In some embodiments, the first polarization state and the second polarization state are orthogonal. For example, for light traveling in the z-direction, the light with the first polarization state may be x-polarized, while light with the second polarization state may be y-polarized. Alternately, the first polarization state and second polarization state may lie along non-orthogonal directions, as long as their vector cross product is in the direction of travel of the light beam.

A polarization beam splitter (PBS) 110 splits the incoming light into a first beam 101 and a second beam 102, where the component of the input beam having a first polarization is split off as first beam 101, while the component of the input beam having a second polarization is split off as second beam 102. For the example shown in FIG. 1(a), PBS 110 reflects light of a first polarization and transmits light of a second polarization. Therefore, first beam 101 is deflected by PBS 110, while second beam 102 passes through PBS 110 with its direction unchanged. First beam 101 is then reflected by a prism 115. In other embodiments, other components and methods may be used to split incoming light into a first beam and a second beam, where the first and second beams have different polarization states.

Figure 1B:
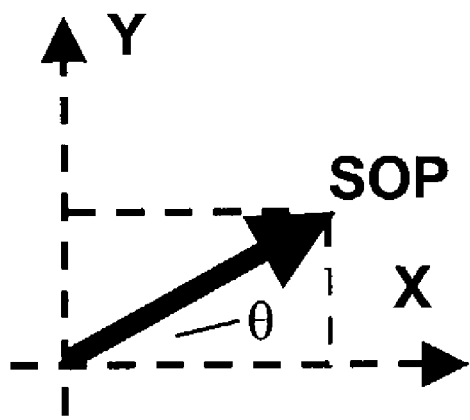
FIG. 1(b) illustrates a relationship between an initial state of polarization and the x and y axes.

After first beam 101 and second beam 102 are split, first beam 101 has intensity $I_1(split)=I_{in}*f_1(\theta)$, while second beam 102 has $I_2(split)=I_{in}*f_2(\theta)$, where $\theta$ is the angle between the input SOP and an optical axis of PBS 110. For example, when the optical axis of PBS 110 is in the x-direction, FIG. 1(b) shows the relationship of the angle $\theta$ to the x and y axes.

First beam 101 passes through a first polarization controller 140, where its polarization is rotated by an angle $\phi$. According to an embodiment, the polarization controller is a fiber squeezer, such as the polarization controller described in the co-owned U.S. Pat. No. 6,389,184, entitled "Fiber squeezer polarization controller with low activation loss," X. Steve Yao, filed on Sep. 30, 2000, Ser. No. 09/676,557, which is hereby incorporated by reference in its entirety. In other embodiments, other polarization controllers such as Faraday rotators, liquid crystals, rotatable waveplates, combinations of a variable retardation plate (made of electro-optic or electro-ceramic material, for example) and a quarter wave plate, or other controllers may be used. First beam 101 is reflected by prism 120. First beam 101 is then incident on a polarization beam combiner (PBC) 125.

In the embodiment shown in FIG. 1(a), the properties of PBC 125 are similar to PBS 110, so that PBC 125 reflects light of a first polarization state and transmits light of a second polarization state. Depending on the polarization state of first beam 101, PBC 125 may reflect a portion equal to some, all, or none of first beam 101 to output port 130. For example, if the optical axis of both PBS 110 and PBC 125 are in the x-direction, substantially all of first beam 101 will be reflected to output port 130 if controller 140 rotates the polarization by 0° or 180° (i.e. first beam 101 is still polarized in the first polarization state after rotation by controller 140), while substantially none of first beam 101 will be reflected to output port 130 if controller 140 rotates the polarization by ±90° (i.e. first beam 101 is polarized in the second polarization state after rotation by controller 140). For other angles of rotation, a portion of first beam 101 will be reflected by PBC 125 to output port 130, while a portion will be transmitted through PBC 125 to port 135.

Similarly, second beam 102 passes through a second polarization controller 145, which may be a fiber squeezer polarization controller or other polarization controller, where its polarization is rotated by an angle $\beta$. The angles $\phi$ and $\beta$ may be the same or different. Second beam 102 is then incident on PBC 125.

A portion equal to some, none, or all of second beam 102 may be transmitted out of device 100 through output port 130. For example, if second polarization controller 145 rotates the polarization of second beam 102 by 0° or 180° (i.e. it is still in the second polarization state), substantially all of second beam 102 will be transmitted through PBC 125 and out of device 100 through output port 130. If second polarization controller 145 rotates the polarization of second beam 102 by ±90° (i.e. it is in the first polarization state), substantially none of second beam 102 will be transmitted out of device 100 through output port 130. For other angles, a portion of second beam 102 will be transmitted out of device 100 through output port 130.

As shown in FIG. 1(a), the portion of first beam 101 and second beam 102 that is not transmitted out of device 100 through output port 130 is transmitted to port 135. Note that in some embodiments, port 135 may be used as an alternative/additional output port. The light may be absorbed or may be routed to other components.

The intensity at output port 130 is equal to $I_{out}= I_1(split)*f_1(\phi)+I_2(split)*f_2(\beta)$. Substituting the values of $I_1(split)$ and $I_2(split)$ above, then $I_{out}=I_{in}[f_1(\theta) f_1(\ ) + f_2(\theta) f_2(\beta)]$. For different initial polarization states, (that is, for different values of $\theta$), the loss is different. Therefore, the system exhibits polarization dependent loss that is controllable by controlling the angles $\phi$ and $\beta$. In some embodiments, the initial polarization $\theta$ may be controlled as well. For example, a polarization controller may be provided prior to PBS 110 in device 100 (see below).

In terms of the intensities of the components with the first polarization state and second polarization state, $I_1(output) =I_{in}f_1(\theta)f_1(\phi)$, while $I_2(output)=I_{in}f_2(\theta)f_2(\beta)$. Thus the fraction of the output light in the first polarization state is equal to $I_1(output)/I_{out}$, while the fraction of the output light in the second polarization state is equal to $I_2 (output)/I_{out}$.

Figure 1C:
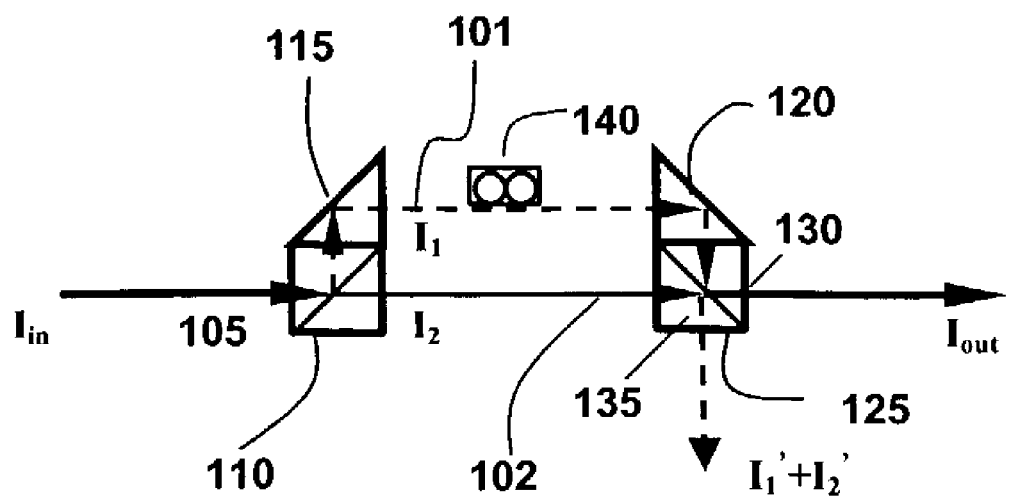
FIG. 1(c) is a side view of a variable PDL device, according to an embodiment of the invention.

In some embodiments, a single polarization controller is used rather than multiple polarization controllers (e.g., a polarization controller for each beam as shown in FIG. 1(a)). FIG. 1(c) shows an embodiment using one polarization controller.

In FIG. 1(c), the polarization of first beam 101 is rotated using polarization controller 140, while the polarization of second beam 102 is not. The output intensity at port 130 is then $I_{out}=I_{in}[f_1(\theta) f_1(\phi)+f_2(\theta)]$. Again, as the initial SOP is varied, the output intensity changes. Therefore, the embodiment shown in FIG. 1(c) exhibits polarization dependent loss. The intensities of light in the first polarization state and second polarization state in this embodiment are then $I_1(output)=I_{in}f_1(\theta)f_1(\phi)$, while $I_2(output) I_{in}f_2(\theta)$.

In some embodiments, first beam 101 and second beam 102 are propagated through free space between optical elements such as polarization controller 140, etc. In other embodiments, first beam 101 and second beam 102 are propagated on a physical medium such as an optical fiber along part or all of their optical path through device 100 (or device 200 of FIG. 2, below, or device 300 of FIG. 3, below).

Figure 2:
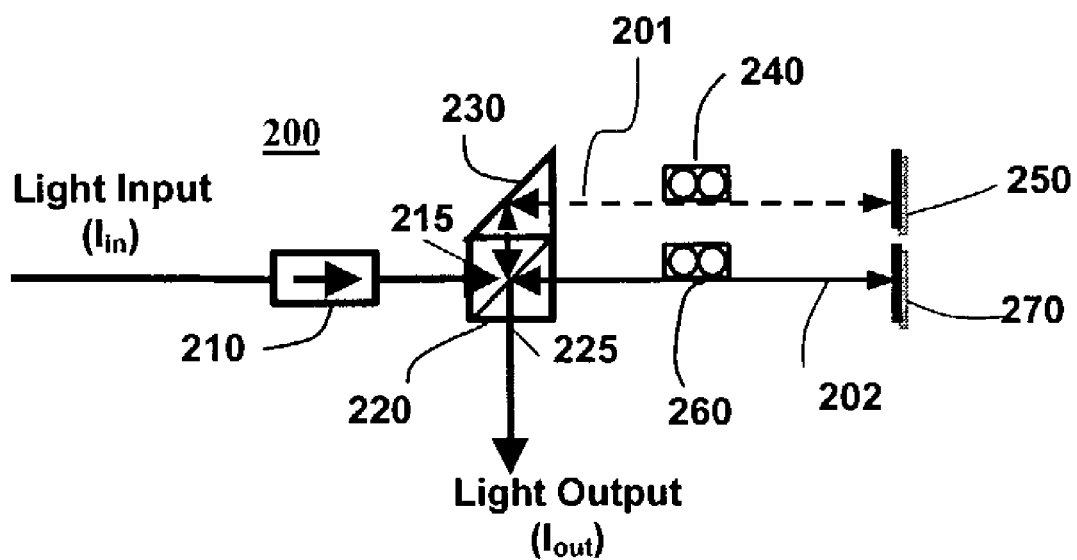
FIG. 2 is a side view of a variable PDL device, according to another embodiment of the invention.

FIG. 2 shows a variable PDL device 200, according to another embodiment of the invention. Light of an intensity $I_{in}$ and an initial SOP enters an isolator 210 of variable PDL device 200. Isolator 210 generally transmits light into variable PDL device 200, but not out of variable PDL device 200. A polarization beam splitter/combiner (PBSC) 220 splits the incoming light into a first beam 201 and a second beam 202.

After being split by PBSC 220, first beam 201 has intensity $I_1(split)=I_{in}*f_1(\theta)$, while second beam 202 has intensity $I_2(split)=I_{in}*f_2(\theta)$, where $\theta$ is the angle between the input SOP and the optical axis of PBSC 220. According to an embodiment, first beam 102 has a first polarization state and is reflected by PBSC 220, while second beam 202 has a second polarization state and is transmitted through PBSC 220, as shown in FIG. 2.

First beam 201 is reflected by a first prism 230, then passes through a first polarization controller 240, which may be a fiber squeezer polarization controller or other controller. Controller 240 rotates the polarization of first beam 201. First beam 201 is then reflected by a first mirror 250. The position of first mirror 250 with respect to a second mirror 260 should be such that the differential group delay (DGD) between first beam 201 and second beam 202 is minimized or eliminated. The DGD may be minimized or eliminated either by mechanical design or by using a simple optical component such as a prism, as is known in the art. First beam 201 passes back through controller 240. Controller 240 again rotates the polarization of first beam 201.

First beam 201 is reflected by first prism 230 and is then incident on PBSC 215. The portion of first beam 201 with a first polarization may then be reflected by PBSC 215, while the portion with a second polarization is transmitted through PBSC 215 to output port 225. The portion that is reflected by PBSC 215 is incident on isolator 210. Since the light is traveling in the "wrong" direction, it is absorbed by isolator 210 rather than transmitted out of device 200; e.g. transmitted out of device 200 through an input fiber.

Second beam 202 is transmitted through PBSC 215, then through a second polarization controller 260, which may be a fiber squeezer polarization controller or other controller. Controller 260 rotates the polarization state of second beam 202. Second beam 202 is then reflected by a second mirror 270. Second beam 202 is transmitted through controller 260 again in the reverse direction, where its polarization is again rotated. First mirror 250 and second mirror 270 may be simple reflective mirrors, 90 degree Faraday rotator mirrors, or other mirrors.

Second beam 202 is then incident on PBSC 215. The portion of second beam 202 with a first polarization is reflected by PBSC 215, and travels out of device 200 through output port 225. The portion of second beam 202 with a second polarization is transmitted through PBSC 215, and is then incident on isolator 210. Since this light is traveling in the "wrong" direction, it is absorbed by isolator 210 rather than transmitted out of device 200; e.g. transmitted out of device 200 through an input fiber.

The intensities of first beam 201 and second beam 202 at output port 225 and the total output intensity $I_{out}$ can be expressed in terms of the initial intensity $I_{in}$. If first controller 240 rotates first beam 201 by an angle $\phi$ each time first beam 201 passes through controller 240, and second controller 260 rotates second beam 202 by an angle $\beta$ each time second beam 202 passes through controller 260, and if the initial polarization state had an angle $\theta$ with respect to the x-axis, then the intensity at output port 225 is equal to $I_{out}$ $I_{in}[f_1(\theta) \ f_1(2\phi)+f_2(\theta) \ f_2(2\beta)]$.

As with the embodiment shown in FIG. 1a, a polarization dependent loss may be introduced using device 200. Theoretically, the PDL value may be as high as the extinction ratio of PBSC 220. The extinction ratio may be, for example, on the order of several tens of dB.

In terms of the intensities of the components with the first polarization state and second polarization state, $I_1$(output) $=I_{in}f_2(\theta)f_2(\beta)$, while $I_2$(output)$=I_{in}f_1(\theta)f_1(\phi)$.

In an embodiment, one of the polarization controllers of FIG. 2 may be removed. For example, if controller 260 is removed, substantially all of second beam 201 is transmitted out of PBSC 220 and absorbed by isolator 210. The output intensity is then $I_{out}=I_{in}f_1(\theta) \ f_1(2\phi)$. Note that in this case the output light is polarized; that is, it is in the second polarization state and does not have a component in the first polarization state.

Figure 3:
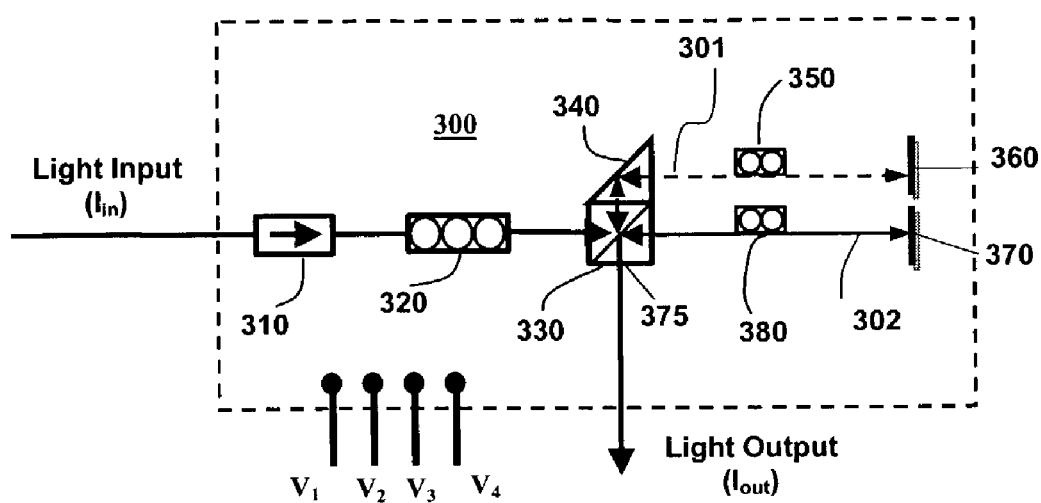
FIG. 3 is a side view of a dynamically controllable variable PDL device, according to an embodiment of the invention.

FIG. 3 shows an embodiment of a controllable variable PDL device 300. A controllable variable PDL source may be used for dynamic conditions, such as along transmission links for PDL compensation. Note that external control of the amount of polarization rotation may be used for the embodiments described above of devices 100 and 200.

Light is incident on device 300 through an isolator 310. Isolator 310 allows light to pass in the forward direction but generally not in the reverse or "wrong" direction. Light may then be transmitted through a variable polarization controller 320. Controller 320 may be used to rotate the initial polarization state of light received by device 300. Controller 320 may be controlled by applying a voltage such as voltage $V_1$ of FIG. 3. For example, when controller 320 is a fiber squeezer controller, voltage $V_1$ may control the amount of pressure applied to the fiber by a piezoelectric mechanism, as more fully described in "Fiber squeezer polarization controller with low activation loss," referenced above. If controller 320 is a Faraday rotator, $V_1$ may control the amount of current through an electromagnet, thus changing the angle of rotation of the Faraday rotator. Control may be provided in other ways; for example, by varying a current or other parameter.

The light is then incident on PBSC 330, which splits the light into a first beam 301 of a first polarization and a second beam 302 of a second polarization. First beam 301 is reflected by a prism 340. First beam 301 is then transmitted through a variable polarization controller 350, where its polarization state may be rotated by an angle $\phi$. Note that the angle $\phi$ may be dynamically changed by altering a voltage such as $V_2$, shown in FIG. 3, or by other control mechanism. First beam 301 is incident on and reflected by a first mirror 360. First beam 301 is then transmitted through controller 350 in the reverse direction, where its polarization state may again be rotated by an angle $\phi$. First beam 301 is then reflected by prism 340 and is incident on PBSC 330.

A portion of first beam 301 having a first polarization may be reflected by PBSC 330, while the remaining portion of first beam 301 having a second polarization may be transmitted through PBSC 330. The portion of first beam 301 that is reflected by PBSC 330 is transmitted through controller 320, where its polarization is rotated, and then into isolator 310. Since the beam is traveling through isolator 310 in the "wrong" direction, substantially none of the light passes out of device 300 through the input.

The portion of first beam 301 that is transmitted through PBSC 330 is then output through output port 375, where it may be further transmitted. For example, the light may be transmitted on an output fiber 385.

After PBSC 330 splits first beam 301 and second beam 302, second beam 302 is transmitted through a variable polarization controller 380, where its polarization state may be rotated by an angle $\beta$. Note that the angle $\beta$ may be dynamically changed by altering a voltage such as $V_3$, shown in FIG. 3, or by other control mechanism. Second beam 302 is incident on and reflected by a second mirror 370. Second beam 302 is then transmitted through controller 380 in the reverse direction, where its polarization state may again be rotated by an angle β. Second beam 302 is then incident on PBSC 330.

A portion of second beam 302 having a first polarization may be reflected by PBSC 330, while the remaining portion of second beam 302 having a second polarization may be transmitted through PBSC-330. The portion of second beam 302 that is transmitted through PBSC 330 is then transmitted through controller 320, where its polarization is rotated, and then into isolator 310. Since the beam is traveling through isolator 310 in the "wrong" direction, substantially none of the light passes out of device 300 through the input.

The portion of second beam 302 that is reflected by PBSC 330 is then output through output port 375, where it may be further transmitted. For example, the light may be transmitted on an output fiber 385.

The intensity at output port 375 is equal to $I_{out} = I_{in}[f_1(\theta) f_1(2\phi) + f_2(\theta) f_2(2\beta)]$. However, the angles θ, φ, and β may be controlled by altering the appropriate voltage. Therefore, the polarization dependent loss may be tailored to compensate for an uncontrolled polarization dependent loss in another part of the system. In terms of the intensities of the components with the first polarization state and second polarization state, $I_1(output) = I_{in}f_2(\theta)f_2(2\beta)$, while $I_2(output) = I_{in}f_1(\theta)f_1(2\phi)$.

A number of embodiments of the invention have been described. Nevertheless, it will be understood that various modifications may be made without departing from the spirit and scope of the invention. For example, different types of polarization controllers, beam splitters, and beam combiners may be used. Accordingly, other embodiments are within the scope of the following claims.

What is claimed is:

1. An optical device, comprising:
   a beam splitter configured to split an input beam having in input intensity into a first beam having a polarization state equal to a first polarization state, said first beam further having a first input intensity, and a second beam having a polarization state equal to a second polarization state, said second beam further having a second input intensity;
   a first variable polarization controller, configured to receive either said first beam or said second beam, further configured to rotate said polarization state of said either said first beam or said second beam by a first angle; and
   a beam combiner, configured to receive said first beam and said second beam, and further configured to transmit an output beam having an output intensity, wherein said output beam has a first component with said first polarization state and a first output intensity, said output beam further having a second component with said second polarization state and a second output intensity, and wherein a ratio of said first output intensity to said output intensity is different than a ratio of said first input intensity to said input intensity.

2. The optical device of claim 1, further comprising an input port for receiving light into said optical device.

3. The optical device of claim 1, further comprising a second polarization controller, configured to receive the other of said either of said first beam or said second beam, further configured to rotate the polarization state of said the other of said either of said first beam or said second beam by a second angle.

4. The optical device of claim 3, wherein said second angle is equal to said first angle.

5. The optical device of claim 3, wherein said second angle is not equal to said first angle.

6. The optical device of claim 1, wherein said first polarization controller includes at least one of a fiber squeezer, a Faraday rotator, a liquid crystal, a rotatable waveplate, and a combination of a variable retardation plate and a quarter wave plate.

7. The optical device of claim 1, wherein said first variable polarization controller is configured to rotate said polarization state in response to a variable voltage.

8. The optical device of claim 1, further including a first redirection element, said first redirection element configured to receive one of either said first beam or said second beam from said beam splitter, said first redirection element further configured to redirect said one of either said first beam or said second beam so that said first polarization controller can receive said one of either said first beam or said second beam.

9. The optical device of claim 1, further including a second redirection element, said second redirection element configured to receive said one of said first beam or said second beam from said polarization controller, said second redirection element further configured to redirect said one of said first beam or said second beam so that said beam combiner can receive said one of said first beam or said second beam.

10. The optical device of claim 1, wherein a ratio of said second output intensity to said output intensity is different than a ratio of said second input intensity to said input intensity.

11. The optical device of claim 1, wherein said beam splitter comprises a polarization beam splitter having an optical axis, wherein said beam splitter reflects incident light having said first polarization state and transmits incident light having said second polarization state.

12. The optical device of claim 11, wherein said beam splitter comprises an optical coating.

13. The optical device of claim 1, wherein said beam combiner comprises a polarization beam combiner having an optical axis, wherein said beam combiner reflects incident light having said first polarization state and transmits incident light having said second polarization state.

14. The optical device of claim 13, wherein said beam combiner comprises an optical coating.

15. The optical device of claim 1, further comprising a third polarization controller configured to receive light with a polarization state, further configured to rotate said polarization state, further configured to transmit said light to said beam splitter as said input beam.

16. An optical device, comprising:
   a beam splitter and combiner, configured to receive light, further configured to reflect light having a polarization state equal to a first polarization state and to transmit light having a polarization state equal to a second polarization state;
   a first variable polarization controller, configured to receive a first beam from said beam splitter and combiner, further configured to rotate said polarization state of said first beam by a variable angle; and
   a first mirror, configured to reflect said first beam.

17. The optical device of claim 16, further comprising an input port for receiving light into said optical device.

18. The optical device of claim 16, further comprising a second polarization controller, configured to receive a second beam from said beam splitter and combiner, further configured to rotate a polarization state of said second beam.

19. The optical device of claim 16, wherein said first polarization controller comprises at least one of a fiber squeezer, a Faraday rotator, a liquid crystal, a rotatable waveplate, and a combination of a variable retardation plate and a quarter wave plate.

20. The optical device of claim 16, wherein said first variable polarization controller is configured to rotate said polarization state in response to a variable voltage.

21. The optical device of claim 16, further including a first redirection element, said first redirection element configured to receive said first beam from said beam splitter and combiner, said first redirection element further configured to redirect said first beam so that said first variable polarization controller can receive said first beam.

22. The optical device of claim 16, wherein said beam splitter and combiner comprises a polarization beam splitter and combiner having an optical axis, wherein said polarization beam splitter and combiner reflects incident light having said first polarization state and transmits incident light having said second polarization state.

23. The optical device of claim 22, wherein said polarization beam splitter and combiner comprises an optical coating.

24. The optical device of claim 16, further comprising a third polarization controller configured to receive light with a polarization state, further configured to rotate said polarization state, further configured to transmit said light to said beam splitter and combiner.

25. An optical device, comprising:
    a beam splitter, positioned to receive an input beam, configured to split said input beam into a first beam having a polarization state equal to a first polarization and a second beam having a polarization state equal to a second polarization;
    a first beam redirection element, positioned to receive said first beam from said beam splitter and to redirect said first beam;
    a first polarization controller, positioned to receive said first beam from said first beam redirection element, configured to rotate said polarization state of said first beam;
    a second beam redirection element, positioned to receive said first beam from said first polarization controller and to redirect said first beam; and
    a beam combiner, positioned to receive said first beam from said second beam redirection element, further positioned to receive said second beam, said beam combiner configured to transmit a portion of said first beam having said first polarization and a portion of said second beam having a second polarization to a first port, further configured to transmit a portion of said first beam having said second polarization and a portion of said second beam having said first polarization to a second port.

26. The optical device of claim 25, further including a second polarization controller positioned to receive said second beam from said beam splitter and to rotate said polarization state of said second beam.

27. The optical device of claim 25, wherein said first port comprises an output port.

28. The optical device of claim 25, wherein said second port comprises an output port.

29. An optical device, comprising:
    a beam splitter/combiner configured to split an input beam into a first beam and a second beam, further configured to receive a reflected first beam and a reflected second beam and to split said reflected first beam and said reflected second beam into a first output beam and a second output beam;
    a first redirection element positioned to receive said first beam from said beam splitter/combiner and to redirect said first beam, further configured to receive said reflected first beam and to redirect said reflected first beam to said beam splitter/combiner;
    a first polarization controller positioned to receive said first beam from said first redirection element, said first polarization controller configured to rotate a polarization state of said first beam by a variable angle, said first polarization controller further positioned to receive said reflected first beam and to transmit said reflected first beam to said first redirection element;
    a first mirror positioned to receive said first beam from said first polarization controller and to reflect said first beam toward said first polarization controller as said reflected first beam;
    a second mirror positioned to receive said second beam and configured to reflect said second beam as said reflected second beam.

30. A method of controlling polarization dependent loss, comprising:
    splitting an input beam leaving an input intensity into a first beam and a second beam, said first beam having a polarization state equal to a first polarization state and further a first input intensity, and said second beam having a polarization state equal to a second polarization state and a second input intensity;
    rotating said polarization state of said first beam;
    rotating said polarization state of said second beam;
    directing a first portion of said first beam having said first polarization state to a first output port;
    directing a second portion of said first beam having said second polarization state to a second output port;
    directing a first portion of said second beam having said first polarization state to said second output port;
    directing a second portion of said second beam having said second polarization state to said first output port;
    wherein said first portion of said first beam has a first output intensity and said second portion of said second beam has a second output intensity, and wherein said first output intensity plus said second output intensity is equal to an output intensity; and
    and wherein a ratio of said first output intensity to said output intensity is different than a ratio of said first input intensity to said input intensity.

31. The method of claim 30, wherein said rotating said polarization state of said first beam comprises rotating said polarization state of said first beam by a first angle with a fiber squeezer.

32. The method of claim 30, wherein said directing a first portion of said first beam having said first polarization state to a first output port comprises direction said first portion of said first beam with a polarization beam combiner.

33. An optical device comprising:
    a beam splitter and combiner, configured to receive light, further configured to reflect light in a first polarization state as a first beam and to transmit light in a second polarization state as a second beam;
    a variable polarization controller located in a path of one of the first and second beams and to rotate a polarization state of said one beam by a variable angle; and a reflector, configured to reflect said first beam and said second beam back to the beam splitter and combiner which combines the reflected first and second beams to produce an output beam.

34. The optical device of claim 33, further comprising a second polarization controller, located in a path of the other of the first beam and the second beam, and configured to rotate a polarization state of said other beam.

35. The optical device of claim 33, further including a controller in communication with the variable polarization controller, wherein the variable polarization controller is configured to rotate said polarization state by a predetermined amount in response to a signal from the controller.

36. The optical device of claim 35, wherein the variable polarization controller comprises a fiber squeezer controller, and wherein the signal from the controller comprises a voltage to control the amount of pressure applied to the fiber.

37. The optical device of claim 35, wherein the variable polarization controller comprises a Faraday rotator, and wherein the signal from the controller comprises a voltage to control the amount of current through an electromagnet.

38. The optical device of claim 35, wherein the reflector comprises at least one mirror.

39. The optical device of claim 35, wherein the reflector is configured to substantially eliminate differential group delay between the first beam and the second beam.

* * * * *